(12) United States Patent
Xu et al.

(10) Patent No.: US 10,917,294 B2
(45) Date of Patent: Feb. 9, 2021

(54) NETWORK FUNCTION INSTANCE MANAGEMENT METHOD AND RELATED DEVICE

(71) Applicant: HUAWEI TECHNOLOGIES CO., LTD., Shenzhen (CN)

(72) Inventors: Ruiyue Xu, Shanghai (CN); Kai Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 77 days.

(21) Appl. No.: 16/181,405

(22) Filed: Nov. 6, 2018

(65) Prior Publication Data
US 2019/0089588 A1    Mar. 21, 2019

Related U.S. Application Data

(63) Continuation of application No. PCT/CN2016/081311, filed on May 6, 2016.

(51) Int. Cl.
*H04L 12/24* (2006.01)
*H04L 29/08* (2006.01)
(Continued)

(52) U.S. Cl.
CPC ...... *H04L 41/0806* (2013.01); *H04L 41/5051* (2013.01); *H04L 47/2491* (2013.01);
(Continued)

(58) Field of Classification Search
CPC ............. H04L 41/0806; H04L 41/5051; H04L 47/2491; H04L 49/253; H04L 67/1012; H04L 67/146
See application file for complete search history.

(56) References Cited

U.S. PATENT DOCUMENTS

2015/0180730 A1* 6/2015 Felstaine ............... H04W 12/08
709/225
2015/0234725 A1* 8/2015 Cillis .................... G06F 11/263
714/33

(Continued)

FOREIGN PATENT DOCUMENTS

CN    104219127 A    12/2014
CN    104734931 A    6/2015

(Continued)

OTHER PUBLICATIONS

ETSI GS NFV-IFA 010 V2.1.1 (Apr. 2016),Network Functions Virtualisation (NFV);Management and Orchestration; Functional requirements specification,ETSI Group Specification,total 60 pages.

*Primary Examiner* — Philip J Chea
*Assistant Examiner* — Robert B McAdams
(74) *Attorney, Agent, or Firm* — Kilpatrick Townsend & Stockton LLP

(57) ABSTRACT

Embodiments of the present invention disclose a network function instance management method, including: receiving a management request for a target network function instance, where the management request for the target network function instance carries an identifier of a target virtualized network function descriptor and an identifier of a first network function instance, and the identifier of the first network function instance is used to determine a connection between the target network function instance and the first network function instance; managing the target network function instance based on the management request for the target network function instance; and establishing the connection between the target network function instance and the first network function instance based on the identifier of the first network function instance. In addition, the embodi- (Continued)

ments of the present invention further disclose a network function instance management apparatus and device.

16 Claims, 8 Drawing Sheets

(51) Int. Cl.
  *H04L 12/857* (2013.01)
  *H04L 12/937* (2013.01)
(52) U.S. Cl.
  CPC ........ *H04L 49/253* (2013.01); *H04L 67/1012* (2013.01); *H04L 67/146* (2013.01)

(56) References Cited

U.S. PATENT DOCUMENTS

| | | | |
|---|---|---|---|
| 2015/0326451 A1 | 11/2015 | Rao et al. | |
| 2015/0365352 A1 | 12/2015 | Xiang et al. | |
| 2016/0226913 A1* | 8/2016 | Sood | G06F 21/552 |
| 2016/0315802 A1* | 10/2016 | Wei | H04L 41/06 |
| 2016/0337329 A1* | 11/2016 | Sood | H04L 63/08 |
| 2017/0012823 A1 | 1/2017 | Zhu et al. | |
| 2017/0126433 A1* | 5/2017 | Yu | H04L 12/4641 |
| 2017/0244596 A1 | 8/2017 | Chen | |
| 2017/0272523 A1* | 9/2017 | Cillis | H04L 41/082 |
| 2018/0013586 A1 | 1/2018 | Wang | |
| 2019/0058670 A1 | 2/2019 | Zhu et al. | |
| 2019/0199760 A1* | 6/2019 | Arauz-Rosado | H04L 61/2061 |

FOREIGN PATENT DOCUMENTS

| | | |
|---|---|---|
| CN | 105122936 A | 12/2015 |
| CN | 105210337 A | 12/2015 |
| CN | 105282765 A | 1/2016 |
| CN | 105429839 A | 3/2016 |
| EP | 3094049 A1 | 11/2016 |
| EP | 3116177 A1 | 1/2017 |
| WO | 2015077377 A1 | 5/2015 |
| WO | 2015113278 A1 | 8/2015 |
| WO | 2015143610 A1 | 10/2015 |
| WO | 2016048430 A1 | 3/2016 |

* cited by examiner

NETWORK FUNCTION INSTANCE MANAGEMENT METHOD AND RELATED DEVICE

CROSS-REFERENCE TO RELATED APPLICATIONS

This application is a continuation of International Application No. PCT/CN2016/081311, filed on May 6, 2016, the disclosure of which is hereby incorporated by reference in its entirety.

TECHNICAL FIELD

The present invention relates to the field of network function instantiation management, and in particular, to a network function instance management method and a related device.

BACKGROUND

With the development of cloud technologies, a virtualization technology, as a basic technology of cloud computing, is widely applied to Enterprise Data Center and the large-scale cluster computing field. A Network Functions Virtualization (NFV) technology is used to implement diversified network functions (such as virtual operation, a virtual wide area network, and a virtual application access router) based on massive and normalized servers and switches by using software, so as to reduce costs, speed up service deployment and flexible resource scaling, and construct an innovative ecological chain. The virtualization technology virtualizes a computer, to obtain a plurality of virtual logical computers, namely, virtual machines (VM). The virtual machine usually performs data communication with an external server by using a virtual network interface card, a virtual switch, and a server physical network port connected to a subrack switch or a Top of Rack switch.

According to the NFV technology, many types of network components may be incorporated into an industrial standard by using the virtualization technology of information technologies (IT). For example, a service, switching, and storage may be deployed in a data center or a network node. Various network functions are implemented by using software, can operate on a server compliant with the industrial standard, and can be, for example, relocated, instantiated, and redeployed as needed, with no need to install a new device. To be specific, a virtualized network function (VNF) is generated. A network service (NS) may be implemented between a plurality of VNFs. The NS is formed by a connection between the VNFs. A virtualized network function descriptor (VNFD) is a template used to deploy a virtual network function. A network service descriptor (NSD) is a template used to deploy a network service. An NSD includes a plurality of VNFDs and a virtualized link descriptor (VLD) between the VNFDs.

With the development of the NFV technology, an operator expects to closely integrate a third party application into an operator network by taking advantages of a channel of the operator, to implement more diversified service processing functions. For example, there is a type of network element, such as mobile edge computing (MEC), that obtains network information such as user location information and cell load information in real time, and provides open application programming interfaces (API) for invoking by various applications (APP) to provide a content-based service. Definitely, there is layer I invocation between an app and a platform for service registration, capability information obtaining, API orchestration, and the like. The app is used as a VNF implementation. How to establish a connection between an app VNF and a platform VNF and flexibly support an app relocation (relocation) operation is a problem that needs to be resolved for the app VNF.

Currently, instantiation and deletion operations of the app VNF are combined into one NS operation. Each time one app is added, a mobile edge orchestrator (MEO) needs to generate an NSD and upload the NSD to a catalog on a corresponding network functions virtualization orchestrator (NFVO) side. Massive NSD maintenance increases system complexity. In addition, an app relocation operation (relocating an app from an MEC platform to another MEC platform) leads to a plurality of interactions between an MEO and an NFVO. As a result, an operation is complex and inflexible.

SUMMARY

In view of a prior-art problem, embodiments of the present invention provide a network function instance management method and a related device, so that a connection between network function instances is automatically established, thereby implementing flexible network function instance management.

A first aspect of the embodiments of the present invention provides a network function instance management method, including:

receiving a management request for a target network function instance, where the management request for the target network function instance carries an identifier of a target virtualized network function descriptor and an identifier of a first network function instance, and the identifier of the first network function instance is used to determine a connection between the target network function instance and the first network function instance;

managing the target network function instance based on the management request for the target network function instance; and establishing the connection between the target network function instance and the first network function instance based on the identifier of the first network function instance.

The identifier of the first network function instance carried in the management request for the target network function instance may be used to determine the connection between the target network function instance and the first network function instance. In this way, the connection between the target network function instance and the first network function instance can be automatically established directly based on the identifier of the first network function instance, and the target network function instance can be managed and the connection between the target network function instance and the first network function instance can be established without a plurality of interactions. This simplifies a process of managing the target network function instance and saves a network function management system resource.

With reference to the first aspect, in a first possible implementation of the first aspect, before the receiving a management request for a target network function instance, the method further includes:

receiving an access information management request for the first network function instance, where the access information management request is used to generate an access information instance of the first network function instance.

With reference to the first possible implementation of the first aspect, in a second possible implementation of the first aspect, after the receiving an access information management request for the first network function instance, the method further includes:

generating the access information instance of the first network function instance based on access information of the first network function instance, where the access information of the first network function instance is included in the access information management request for the first network function instance or a first virtualized network function descriptor.

The access information of the first network function instance is added to the access information management request for the first network function instance or the first virtualized network function descriptor, and a corresponding access information instance may be generated based on the access information. In this way, when the target network function instance is managed, the access information instance of the first network function instance can be searched for and obtained based on the identifier of the first network function instance, so that the connection between the target network function instance and the first network function instance is automatically established based on the access information instance.

With reference to the first possible implementation of the first aspect or the second possible implementation of the first aspect, in a third possible implementation of the first aspect, the access information of the first network function instance includes one or more of an external connection point descriptor identifier, a connection requirement, and a maximum accessible quantity of the first network function instance.

With reference to the first possible implementation of the first aspect, the second possible implementation of the first aspect, or the third possible implementation of the first aspect, in a fourth possible implementation of the first aspect, the access information instance of the first network function instance includes one or more of the instance identifier, external connection point instance information, the connection requirement, and the maximum accessible quantity of the first network function instance.

With reference to any one of the first aspect, or the first possible implementation of the first aspect to the fourth possible implementation of the first aspect, in a fifth possible implementation of the first aspect, before the receiving a management request for a target network function instance, the method further includes:

receiving the target virtualized network function descriptor, where the target virtualized network function descriptor includes type information of the target network function instance.

With reference to any one of the first aspect, or the first possible implementation of the first aspect to the fifth possible implementation of the first aspect, in a sixth possible implementation of the first aspect, the managing the target network function instance includes:

obtaining the corresponding target virtualized network function descriptor based on the identifier of the target virtualized network function descriptor; and managing the target network function instance based on the target virtualized network function descriptor.

With reference to any one of the first aspect, or the first possible implementation of the first aspect to the sixth possible implementation of the first aspect, in a seventh possible implementation of the first aspect, the establishing the connection between the target network function instance and the first network function instance based on the identifier of the first network function instance includes:

searching for the access information instance of the first network function instance based on the identifier of the first network function instance; and establishing the connection between the target network function instance and the first network function instance based on the access information instance of the first network function instance.

The access information instance of the first network function instance is searched for and obtained based on the identifier of the first network function instance, so that the connection between the target network function instance and the first network function instance is automatically established based on the access information instance. In this way, the target network function instance can be managed and the connection between the target network function instance and the first network function instance can be established without a plurality of interactions. This simplifies a process of managing the target network function instance and saves a network function instance management system resource.

A second aspect of the embodiments of the present invention provides a network function instance management method, including:

receiving a management request for a target network function instance, where the management request carries an identifier of the target network function instance and an identifier of a second network function instance, and the identifier of the second network function instance is used to determine a connection between the target network function instance and the second network function instance;

managing the target network function instance based on the management request for the target network function instance; and establishing the connection between the target network function instance and the second network function instance based on the identifier of the second network function instance.

The identifier of the second network function instance carried in the management request for the target network function instance may be used to determine the connection between the target network function instance and the second network function instance. In this way, the connection between the target network function instance and the second network function instance can be automatically established directly based on the identifier of the second network function instance, and the target network function instance can be managed and the connection between the target network function instance and the second network function instance can be established without a plurality of interactions. This simplifies a process of managing the target network function instance and saves a network function management system resource.

With reference to the second aspect, in a first possible implementation of the second aspect, the management request further carries an identifier of a first network function instance, and the identifier of the first network function instance is used to release a connection between the target network function instance and the first network function instance.

The connection between the target network function instance and the first network function instance may be released based on the identifier of the first network function instance. In this way, before the connection between the target network function instance and the second network function instance is established, or after the connection between the target network function instance and the second network function instance is established, the connection between the target network function instance and the first network function instance can be automatically released based on the identifier of the first network function instance, thereby relocating the target network function instance from the connection to the first network function instance to the connection to the second network function instance.

With reference to the first possible implementation of the second aspect, in a second possible implementation of the second aspect, the management request further carries an operation type identifier, and the operation type identifier is used to determine a time at which the connection between the target network function instance and the first network function instance is released.

The operation type identifier is added to the management request. In this way, in a process of managing the target network function instance, the time at which the connection between the target network function instance and the first network function instance is released can be determined based on a type of the operation type identifier. This improves management flexibility of the target network function instance.

With reference to the first possible implementation of the second aspect or the second possible implementation of the second aspect, in a third possible implementation of the second aspect, before the establishing the connection between the target network function instance and the second network function instance based on the identifier of the second network function instance, or after the establishing the connection between the target network function instance and the second network function instance based on the identifier of the second network function instance, the method further includes:

releasing the connection between the target network function instance and the first network function instance.

With reference to the second aspect, the first possible implementation of the second aspect, the second possible implementation of the second aspect, or the third possible implementation of the second aspect, in a fourth possible implementation of the second aspect, the establishing the connection between the target network function instance and the second network function instance based on the identifier of the second network function instance includes:

searching for an access information instance of the second network function instance based on the identifier of the second network function instance; and establishing the connection between the target network function instance and the second network function instance based on the access information instance of the second network function instance.

The access information instance of the second network function instance is searched for and obtained based on the identifier of the second network function instance, so that the connection between the target network function instance and the second network function instance is automatically established based on the access information instance. In this way, the target network function instance can be managed and the connection between the target network function instance and the second network function instance can be established without a plurality of interactions. This simplifies a process of managing the target network function instance and saves a network function instance management system resource.

A third aspect of the embodiments of the present invention provides a network function instance management apparatus, including:

a receiving unit, configured to receive a management request for a target network function instance, where the management request for the target network function instance carries an identifier of a target virtualized network function descriptor and an identifier of a first network function instance, and the identifier of the first network function instance is used to determine a connection between the target network function instance and the first network function instance;

a target network function management unit, configured to manage the target network function instance based on the management request for the target network function instance; and a connection management unit, configured to establish the connection between the target network function instance and the first network function instance based on the identifier of the first network function instance.

The identifier of the first network function instance carried in the management request for the target network function instance may be used to determine the connection between the target network function instance and the first network function instance. In this way, the connection between the target network function instance and the first network function instance can be automatically established directly based on the identifier of the first network function instance, and the target network function instance can be managed and the connection between the target network function instance and the first network function instance can be established without a plurality of interactions. This simplifies a process of managing the target network function instance and saves a network function management system resource.

With reference to the third aspect, in a first possible implementation of the third aspect, the receiving unit is further configured to receive an access information management request for the first network function instance, where the access information management request is used to generate an access information instance of the first network function instance.

With reference to the first possible implementation of the third aspect, in a second possible implementation of the third aspect, the apparatus further includes a first network function management unit, configured to generate the access information instance of the first network function instance based on access information of the first network function instance, where the access information of the first network function instance is included in the access information management request for the first network function instance or a first virtualized network function descriptor.

The access information of the first network function instance is added to the access information management request for the first network function instance or the first virtualized network function descriptor, and a corresponding access information instance may be generated based on the access information. In this way, when the target network function instance is managed, the access information instance of the first network function instance can be searched for and obtained based on the identifier of the first network function instance, so that the connection between the target network function instance and the first network function instance is automatically established based on the access information instance.

With reference to the first possible implementation of the third aspect or the second possible implementation of the third aspect, in a third possible implementation of the third aspect, the access information of the first network function instance includes one or more of an external connection point descriptor identifier, a connection requirement, and a maximum accessible quantity of the first network function instance.

With reference to the first possible implementation of the third aspect, the second possible implementation of the third aspect, or the third possible implementation of the third aspect, in a fourth possible implementation of the third aspect, the access information instance of the first network function instance includes one or more of the instance identifier, external connection point instance information, the connection requirement, and the maximum accessible quantity of the first network function instance.

With reference to any one of the third aspect, or the first possible implementation of the third aspect to the fourth possible implementation of the third aspect, in a fifth possible implementation of the third aspect, the receiving unit is further configured to receive the target virtualized network function descriptor, where the target virtualized network function descriptor includes type information of the target network function instance.

With reference to any one of the third aspect, or the first possible implementation of the third aspect to the fifth possible implementation of the third aspect, in a sixth possible implementation of the third aspect, the target network function management unit is further configured to:

obtain the corresponding target virtualized network function descriptor based on the identifier of the target virtualized network function descriptor; and manage the target network function instance based on the target virtualized network function descriptor.

With reference to any one of the third aspect, or the first possible implementation of the third aspect to the sixth possible implementation of the first aspect, in a seventh possible implementation of the third aspect, the connection management unit is further configured to search for the access information instance of the first network function instance based on the identifier of the first network function instance; and:

establish the connection between the target network function instance and the first network function instance based on the access information instance of the first network function instance.

The access information instance of the first network function instance is searched for and obtained based on the identifier of the first network function instance, so that the connection between the target network function instance and the first network function instance is automatically established based on the access information instance. In this way, the target network function instance can be managed and the connection between the target network function instance and the first network function instance can be established without a plurality of interactions. This simplifies a process of managing the target network function instance and saves a network function instance management system resource.

A fourth aspect of the embodiments of the present invention provides a network function instance management apparatus, including:

a receiving unit, configured to receive a management request for a target network function instance, where the management request carries an identifier of the target network function instance and an identifier of a second network function instance, and the identifier of the second network function instance is used to determine a connection between the target network function instance and the second network function instance;

a target network function management unit, configured to manage the target network function instance based on the management request for the target network function instance; and a connection management unit, configured to establish the connection between the target network function instance and the second network function instance based on the identifier of the second network function instance.

The identifier of the second network function instance carried in the management request for the target network function instance may be used to determine the connection between the target network function instance and the second network function instance. In this way, the connection between the target network function instance and the second network function instance can be automatically established directly based on the identifier of the second network function instance, and the target network function instance can be managed and the connection between the target network function instance and the second network function instance can be established without a plurality of interactions. This simplifies a process of managing the target network function instance and saves a network function management system resource.

With reference to the fourth aspect, in a first possible implementation of the fourth aspect, the management request further carries an identifier of a first network function instance, and the identifier of the first network function instance is used to release a connection between the target network function instance and the first network function instance.

The connection between the target network function instance and the first network function instance may be released based on the identifier of the first network function instance. In this way, before the connection between the target network function instance and the second network function instance is established, or after the connection between the target network function instance and the second network function instance is established, the connection between the target network function instance and the first network function instance can be automatically released based on the identifier of the first network function instance, thereby relocating the target network function instance from the connection to the first network function instance to the connection to the second network function instance.

With reference to the first possible implementation of the fourth aspect, in a second possible implementation of the fourth aspect, the management request further carries an operation type identifier, and the operation type identifier is used to determine a time at which the connection between the target network function instance and the first network function instance is released.

The operation type identifier is added to the management request. In this way, in a process of managing the target network function instance, the time at which the connection between the target network function instance and the first network function instance is released can be determined based on a type of the operation type identifier. This improves management flexibility of the target network function instance.

With reference to the first possible implementation of the fourth aspect or the second possible implementation of the fourth aspect, in a third possible implementation of the fourth aspect, before establishing the connection between the target network function instance and the second network function instance based on the identifier of the second network function instance, or after establishing the connection between the target network function instance and the second network function instance based on the identifier of the second network function instance, the connection management unit is further configured to:

release the connection between the target network function instance and the first network function instance.

With reference to the fourth aspect, the first possible implementation of the fourth aspect, the second possible implementation of the fourth aspect, or the third possible implementation of the fourth aspect, in a fourth possible implementation of the fourth aspect, the connection management unit is further configured to:

search for an access information instance of the second network function instance based on the identifier of the second network function instance; and establish the connection between the target network function instance and the second network function instance based on the access information instance of the second network function instance.

The access information instance of the second network function instance is searched for and obtained based on the identifier of the second network function instance, so that the connection between the target network function instance and the second network function instance is automatically established based on the access information instance. In this way, the target network function instance can be managed and the connection between the target network function instance and the second network function instance can be established without a plurality of interactions. This simplifies a process of managing the target network function instance and saves a network function instance management system resource.

A fifth aspect of the embodiments of the present invention provides a network function instance management device, including at least one computing component, at least one storage component, at least one network component, and a communications bus, where the computing component, the storage component, and the network component are connected to and communicate with each other by using the communications bus; and the computing component is configured to: invoke executable program code stored in the storage component, and perform the following operations:

receiving a management request for a target network function instance, where the management request for the target network function instance carries an identifier of a target virtualized network function descriptor and an identifier of a first network function instance, and the identifier of the first network function instance is used to determine a connection between the target network function instance and the first network function instance;

managing the target network function instance based on the management request for the target network function instance; and establishing the connection between the target network function instance and the first network function instance based on the identifier of the first network function instance.

The identifier of the first network function instance carried in the management request for the target network function instance may be used to determine the connection between the target network function instance and the first network function instance. In this way, the connection between the target network function instance and the first network function instance can be automatically established directly based on the identifier of the first network function instance, and the target network function instance can be managed and the connection between the target network function instance and the first network function instance can be established without a plurality of interactions. This simplifies a process of managing the target network function instance and saves a network function management system resource.

With reference to the fifth aspect, in a first possible implementation of the fifth aspect, before the receiving a management request for a target network function instance, the operations further include:

receiving an access information management request for the first network function instance, where the access information management request is used to generate an access information instance of the first network function instance.

With reference to the first possible implementation of the fifth aspect, in a second possible implementation of the fifth aspect, after the receiving an access information management request for the first network function instance, the operations further include:

generating the access information instance of the first network function instance based on access information of the first network function instance, where the access information of the first network function instance is included in the access information management request for the first network function instance or a first virtualized network function descriptor.

The access information of the first network function instance is added to the access information management request for the first network function instance or the first virtualized network function descriptor, and a corresponding access information instance may be generated based on the access information. In this way, when the target network function instance is managed, the access information instance of the first network function instance can be searched for and obtained based on the identifier of the first network function instance, so that the connection between the target network function instance and the first network function instance is automatically established based on the access information instance.

With reference to the first possible implementation of the fifth aspect or the second possible implementation of the fifth aspect, in a third possible implementation of the fifth aspect, the access information of the first network function instance includes one or more of an external connection point descriptor identifier, a connection requirement, and a maximum accessible quantity of the first network function instance.

With reference to the first possible implementation of the fifth aspect, the second possible implementation of the fifth aspect, or the third possible implementation of the fifth aspect, in a fourth possible implementation of the fifth aspect, the access information instance of the first network function instance includes one or more of the instance identifier, external connection point instance information, the connection requirement, and the maximum accessible quantity of the first network function instance.

With reference to any one of the fifth aspect, or the first possible implementation of the fifth aspect to the fourth possible implementation of the fifth aspect, in a fifth implementation of the fifth aspect, before the receiving a management request for a target network function instance, the operations further include:

receiving the target virtualized network function descriptor, where the target virtualized network function descriptor includes type information of the target network function instance.

With reference to any one of the fifth aspect, or the first possible implementation of the fifth aspect to the fifth possible implementation of the fifth aspect, in a sixth possible implementation of the fifth aspect, the managing the target network function instance includes:

obtaining the corresponding target virtualized network function descriptor based on the identifier of the target virtualized network function descriptor; and managing the target network function instance based on the target virtualized network function descriptor.

With reference to any one of the fifth aspect, or the first possible implementation of the fifth aspect to the sixth possible implementation of the fifth aspect, in a seventh possible implementation of the fifth aspect, the establishing the connection between the target network function instance and the first network function instance based on the identifier of the first network function instance includes:

searching for the access information instance of the first network function instance based on the identifier of the first network function instance; and establishing the connection between the target network function instance and the first network function instance based on the access information instance of the first network function instance.

The access information instance of the first network function instance is searched for and obtained based on the identifier of the first network function instance, so that the connection between the target network function instance and the first network function instance is automatically established based on the access information instance. In this way, the target network function instance can be managed and the connection between the target network function instance and the first network function instance can be established without a plurality of interactions. This simplifies a process of managing the target network function instance and saves a network function instance management system resource.

A sixth aspect of the embodiments of the present invention provides a network function instance management device, including at least one computing component, at least one storage component, at least one network component, and a communications bus, where the computing component, the storage component, and the network component are connected to and communicate with each other by using the communications bus; and the computing component is configured to: invoke executable program code stored in the storage component, and perform the following operations:

receiving a management request for a target network function instance, where the management request carries an identifier of the target network function instance and an identifier of a second network function instance, and the identifier of the second network function instance is used to determine a connection between the target network function instance and the second network function instance;

managing the target network function instance based on the management request for the target network function instance; and establishing the connection between the target network function instance and the second network function instance based on the identifier of the second network function instance.

The identifier of the second network function instance carried in the management request for the target network function instance may be used to determine the connection between the target network function instance and the second network function instance. In this way, the connection between the target network function instance and the second network function instance can be automatically established directly based on the identifier of the second network function instance, and the target network function instance can be managed and the connection between the target network function instance and the second network function instance can be established without a plurality of interactions. This simplifies a process of managing the target network function instance and saves a network function management system resource.

With reference to the sixth aspect, in a first possible implementation of the sixth aspect, the management request further carries an identifier of a first network function instance, and the identifier of the first network function instance is used to release a connection between the target network function instance and the first network function instance.

The connection between the target network function instance and the first network function instance may be released based on the identifier of the first network function instance. In this way, before the connection between the target network function instance and the second network function instance is established, or after the connection between the target network function instance and the second network function instance is established, the connection between the target network function instance and the first network function instance can be automatically released based on the identifier of the first network function instance, thereby relocating the target network function instance from the connection to the first network function instance to the connection to the second network function instance.

With reference to the first possible implementation of the sixth aspect, in a second possible implementation of the sixth aspect, the management request further carries an operation type identifier, and the operation type identifier is used to determine a time at which the connection between the target network function instance and the first network function instance is released.

The operation type identifier is added to the management request. In this way, in a process of managing the target network function instance, the time at which the connection between the target network function instance and the first network function instance is released can be determined based on a type of the operation type identifier. This improves management flexibility of the target network function instance.

With reference to the first possible implementation of the sixth aspect or the second possible implementation of the sixth aspect, in a third possible implementation of the sixth aspect, before the establishing the connection between the target network function instance and the second network function instance based on the identifier of the second network function instance, or after the establishing the connection between the target network function instance and the second network function instance based on the identifier of the second network function instance, the operations further include:

releasing the connection between the target network function instance and the first network function instance.

With reference to the sixth aspect, the first possible implementation of the sixth aspect, the second possible implementation of the sixth aspect, or the third possible implementation of the sixth aspect, in a fourth possible implementation of the sixth aspect, the establishing the connection between the target network function instance and the second network function instance based on the identifier of the second network function instance includes:

searching for an access information instance of the second network function instance based on the identifier of the second network function instance; and establishing the connection between the target network function instance and the second network function instance based on the access information instance of the second network function instance.

The access information instance of the second network function instance is searched for and obtained based on the identifier of the second network function instance, so that the connection between the target network function instance and the second network function instance is automatically established based on the access information instance. In this way, the target network function instance can be managed and the connection between the target network function instance and the second network function instance can be established without a plurality of interactions. This simplifies a process of managing the target network function instance and flexibly manages the target network function instance.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

The following describes the technical solutions in the embodiments of the present invention with reference to the accompanying drawings in the embodiments of the present invention.

Figure 1:
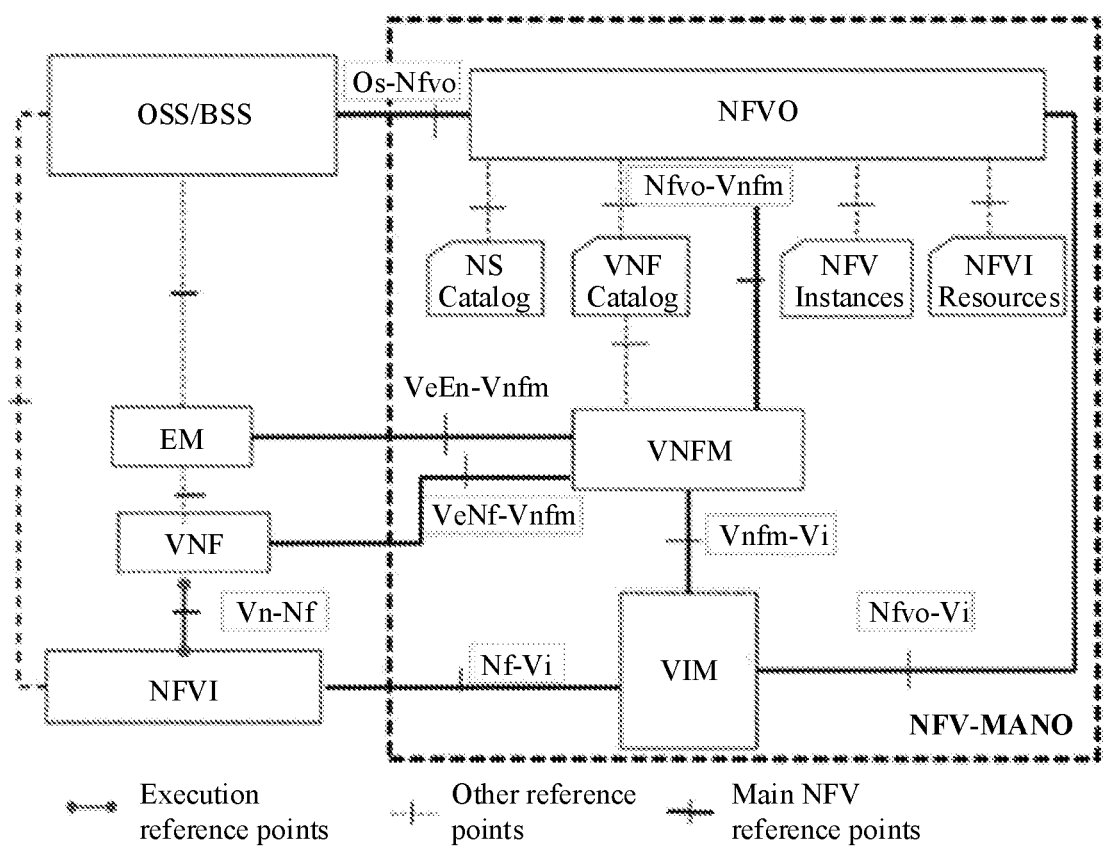
FIG. 1 is a schematic structural diagram of a network function virtualization management and orchestration system to which a network function instance management method according to an embodiment of the present invention is applied.

FIG. 1 is a schematic structural diagram of a Network Functions Virtualization (NFV) Management and Orchestration system to which a network function instance management method according to an embodiment of the present invention is applied. The NFV Management and Orchestration system includes a business support system (BSS)/ operation support system (Operation Support System, OSS), a virtualized network function (VNF) unit, an element management (EM) unit, a network functions virtualization infrastructure (NFVI), and a Network Functions Virtualization Management and Orchestration (NFV-Management and Orchestration, NFV-MANO) unit. The NFVI includes a hardware component, a software component, or a combination of thereof, and is configured to provide a virtualization resource for the VNF unit. The VNF unit is deployed above a bottom-layer NFVI. The EM unit is configured to manage one or more VNF units. Both the NFVI and the EM unit are connected to the BSS/OSS. The VNF unit and the NFVI are connected to each other by using a Vn-Nf interface. The NFV-MANO unit is configured to manage the VNF unit and the NFVI.

Specifically, the NFV-MANO unit further includes a virtualized infrastructure manager (VIM), a virtualized network function manager (VNFM), and a network functions virtualization orchestrator (NFVO). The VIM is connected to the NFVI by using an Nf-Vi interface, and is responsible for performing, for example, unified management, monitoring, and optimization on a hardware virtualization resource provided by the NFVI. The VNFM is connected to the VNF unit and the EM unit by using a VeNf-Vnfm interface, is connected to the VIM by using a Vnfm-Vi interface, and is connected to the NFVO by using an Nfvo-Vnfm interface. The VNFM is configured to manage a life cycle of a network function instance, for example, to instantiate, update, relocate, query, terminate, or delete the network function instance. The NFVO is connected to the BSS/OSS by using an Os-Nfvo interface, and is connected to a virtualized network function catalog (VNF Catalog) server, a network service catalog (NS Catalog) server, a network functions virtualization instance (NFV Instance) server, and a network functions virtualization infrastructure resource (NFVI Resource) server. The NFVO is responsible for orchestrating and managing layer I infrastructure resources and upper-layer software resources of the NFV. For example, the NFVO may communicate with one or more VNFMs to implement a resource related request, send configuration information to the VNFM, and collect status information of the network function instance. In addition, the NFVO may further communicate with the VIM, to implement resource allocation and/or reservation and exchange a virtualization hardware resource configuration and status information.

Figure 2:
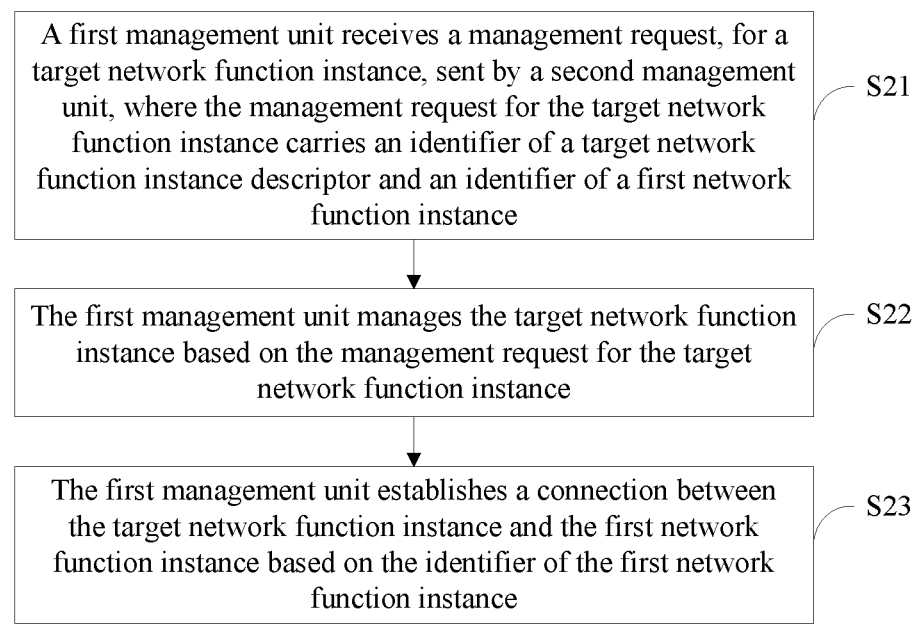
FIG. 2 is a first schematic flowchart of a network function instance management method according to an embodiment of the present invention.

Referring to FIG. 2, an embodiment of the present invention provides a network function instance management method. The method includes the following steps:

Step S21: A first management unit receives a management request, for a target network function instance, sent by a second management unit, where the management request for the target network function instance carries an identifier of a target virtualized network function descriptor and an identifier of a first network function instance, and the identifier of the first network function instance is used to determine a connection between the target network function instance and the first network function instance.

Step S22: The first management unit manages the target network function instance based on the management request for the target network function instance.

Step S23: The first management unit establishes the connection between the target network function instance and the first network function instance based on the identifier of the first network function instance.

The first management unit and the second management unit may be but are not limited to any one of management units such as a BSS/OSS, an app manager, an EM unit, a mobile edge orchestrator (MEO), an NFVO, a VNFM, a network management (NM) unit, a service orchestration (SO) unit, and a network orchestration (NO) unit. It can be understood that when the first management unit is one of the foregoing management units, the second management unit may be any one of remaining management units different from the first management unit. For example, when the first management unit is the app manager, the second management unit may be but is not limited to any one of management units such as the BSS/OSS, the EM unit, the MEO, the NFVO, the VNFM, the NM, the SO, and the NO. The network function instance may be but is not limited to a VNF instance, an app instance, a network element instance, or the like. For example, the target network function instance may be an app network function instance or the app instance, and the first network function instance may be a platform network function instance or a logical network element instance such as a platform network element or any other network element used as a platform network element. The management request for the target network function instance may be but is not limited to, for example, a management request for instantiation, updating, scale-out, or scale-in of the target network function instance.

Before the receiving a management request for a target network function instance, the method further includes:

receiving the target virtualized network function descriptor, where the target virtualized network function descriptor includes type information of the target network function instance; and the managing the target network function instance includes:

obtaining the corresponding target virtualized network function descriptor based on the identifier of the target virtualized network function descriptor;

determining a type of the target network function instance based on the type information of the target network function instance in the target virtualized network function descriptor; and managing the target network function instance based on the target virtualized network function descriptor and the type of the target network function instance, where the managing the target network function instance may be but is not limited to management such as instantiation, updating, scale-out, or scale-in of the target network function instance.

The establishing the connection between the target network function instance and the first network function instance based on the identifier of the first network function instance includes:

searching for an access information instance of the first network function instance based on the identifier of the first network function instance; and establishing the connection between the target network function instance and the first network function instance based on the access information instance of the first network function instance.

Figure 3:
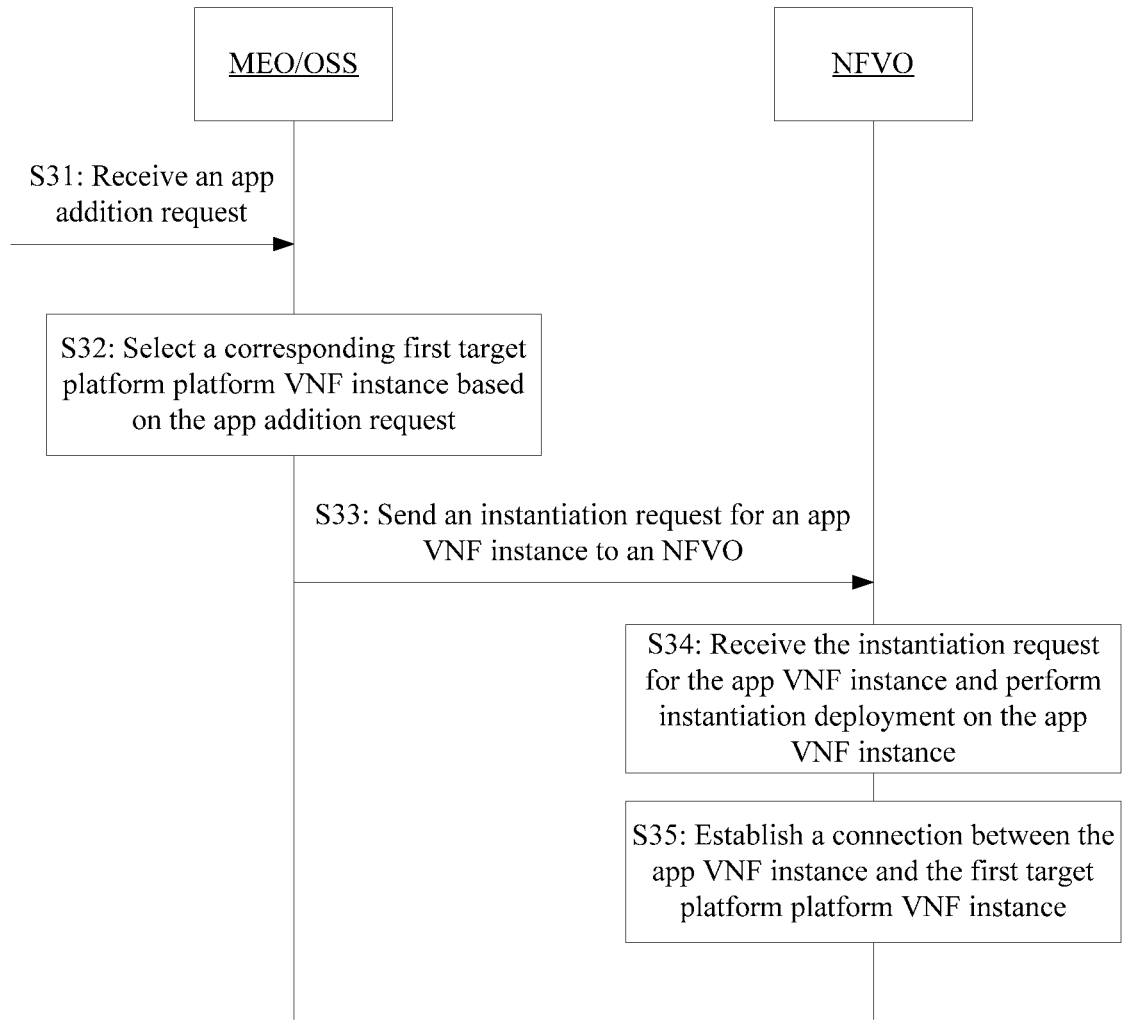
FIG. 3 is a second schematic flowchart of a network function instance management method according to an embodiment of the present invention.

Referring to FIG. 3, in this embodiment, the first management unit is an NFVO, the second management unit is an MEO/OSS, the target network function instance is an app VNF instance, the first network function instance is a first target platform VNF instance, and the management request for the target network function instance is an instantiation request for the app VNF instance. In this case, the method includes the following steps:

Step S31: The MEO/OSS receives an app addition request, where the app addition request carries preset policy information, and the preset policy information is used to determine the first target platform VNF instance. It can be understood that the preset policy information may be carried in the app addition request or may be preset in the MEO/OSS.

Step S32: The MEO/OSS selects a corresponding first target platform VNF instance based on the app addition request.

Step S33: The MEO/OSS sends the instantiation request for the app VNF instance to the NFVO, where the instantiation request for the app VNF instance carries an identifier of an app VNF descriptor (App VNFD ID) and an identifier of the first target platform VNF instance (Platform VNF Instance ID).

Step S34: The NFVO receives the instantiation request for the app VNF instance and performs instantiation deployment on the app VNF instance.

Step S35: The NFVO obtains an access information instance of the first target platform VNF instance based on the platform VNF instance ID, and establishes a connection between the app VNF instance and the first target platform VNF instance.

Before the MEO/OSS sends the instantiation request for the app VNF instance to the NFVO, the method may further include the following step:

The MEO/OSS sends the app VNF descriptor (App VNFD) to the NFVO, and the NFVO uploads the app VNF descriptor to a corresponding VNF catalog server. The app VNFD includes type information used to identify an app type. It can be understood that the app VNF descriptor and the instantiation request for the app VNF instance may be sent by different senders, and the app VNF descriptor and the instantiation request for the app VNF instance may also be received by different receivers. For example, the OSS may send the app VNF descriptor to the NFVO, and the app manager may send the instantiation request for the app VNF instance to the VNFM.

Before the receiving, by a first management unit, a management request, for a target network function instance, sent by a second management unit, the method further includes:

receiving, by the first management unit, a management request, for the first network function instance, sent by the second management unit, where the management request for the first network function instance carries an identifier of a first virtualized network function descriptor; and managing, by the first management unit, the first network function instance based on the management request for the first network function instance, where the management request for the first network function instance may be but is not limited to an instantiation request, an update request, a scale-out request, a scale-in request, or the like; and the managing the first network function instance may be but is not limited to management such as instantiation, updating, scale-out, or scale-in of the first network function instance.

Before the receiving, by the first management unit, a management request, for the first network function instance, sent by the second management unit, the method further includes:

receiving the first virtualized network function descriptor, where the first virtualized network function descriptor includes type information of the first network function instance, where the type information of the first network function instance is used to indicate a type of the first network function instance, for example, in this embodiment, the type information of the first network function instance is used to indicate that the first network function instance is a platform VNF instance.

Before the receiving a management request for a target network function instance, the method further includes:

receiving, by the first management unit, an access information management request, for the first network function instance, sent by the second management unit, where the access information management request is used to generate the access information instance of the first network function instance. It can be understood that the access information management request may be an instantiation request for the first network function instance.

After the receiving an access information management request for the first network function instance, the method further includes:

generating the access information instance of the first network function instance based on access information of the first network function instance, where the access information of the first network function instance may be included in the access information management request for the first network function instance or the first virtualized network function descriptor.

In this embodiment, the access information of the first network function instance includes but is not limited to one or more of an external connection point descriptor identifier, a connection requirement, and a maximum accessible quantity of the first network function instance. Correspondingly, the access information instance of the first network function instance includes but is not limited to one or more of the instance identifier, external connection point instance information, the connection requirement, and the maximum accessible quantity of the first network function instance.

Figure 4:
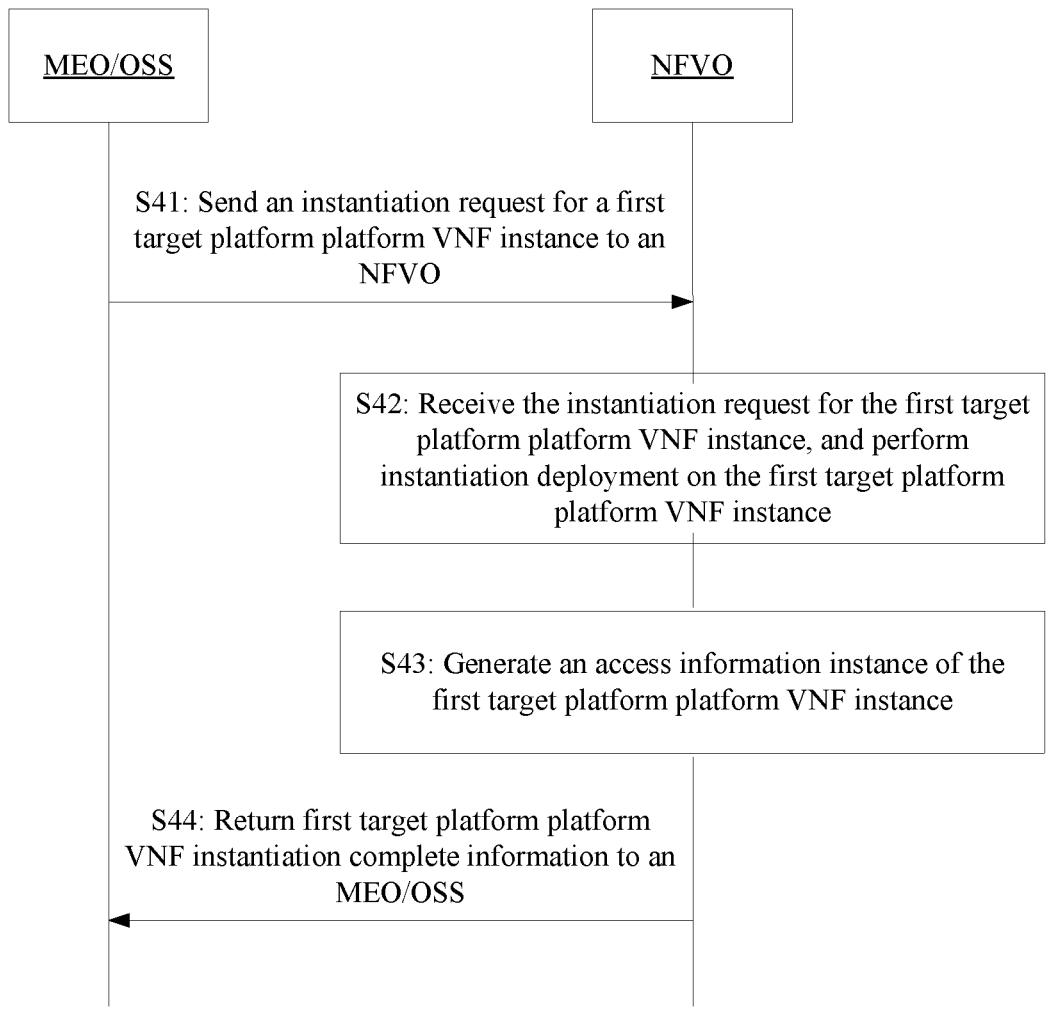
FIG. 4 is a third schematic flowchart of a network function instance management method according to an embodiment of the present invention.

Referring to FIG. 4, in this embodiment, the first management unit is an NFVO, the second management unit is an MEO/OSS, the first network function instance is a first target platform VNF instance, and the management request for the first network function instance is an instantiation request for the first target platform VNF instance. In this case, the method further includes the following steps:

Step S41: The MEO/OSS sends the instantiation request for the first target platform VNF instance to the NFVO, where the instantiation request for the first target platform VNF instance carries an identifier of a first target platform VNF descriptor (Platform VNFD ID).

Step S42: The NFVO receives the instantiation request for the first target platform VNF instance, and performs instantiation deployment on the first target platform VNF instance.

Step S43: The NFVO generates an access information instance of the first target platform VNF instance.

Step S44: The NFVO returns first target platform VNF instantiation complete information to the MEO/OSS, where the instantiation complete information includes an identifier of the first target platform VNF instance (Platform VNF Instance ID).

Before the MEO/OSS sends the instantiation request for the first target platform VNF instance to the NFVO, the method may further include the following step:

The MEO/OSS sends a VNF descriptor of the first target platform VNF instance (Platform VNFD) to the NFVO, where the platform VNFD includes type information of the first target platform VNF instance. It can be understood that the VNF descriptor of the first target platform VNF instance and the instantiation request for the first target platform VNF instance may be sent by different senders and may also be received by different receivers. For example, the OSS may send the VNF descriptor of the first target platform VNF instance to the NFVO, and the EM unit may send the instantiation request for the first target platform VNF instance to the VNFM.

It can be understood that the instantiation request for the first target platform VNF instance or the VNF virtualized network function descriptor of the first target platform VNF instance may further include access information of the first target platform VNF instance, and the access information is used to generate the access information instance of the first target platform VNF instance. For example, the access information may include one or more of an external connection point descriptor identifier (External CPD), a connection requirement, and a maximum accessible app quantity of the first target platform VNF instance.

In this embodiment, the management request for the target network function instance carries the identifier of the target virtualized network function descriptor virtualized network function descriptor and the identifier of the first network function instance, and the identifier of the first network function instance may be used to determine the connection between the target network function instance and the first network function instance, so that the first management unit can automatically establish the connection between the target network function instance and the first network function instance based on the management request for the target network function instance. This avoids an interaction between the first management unit and the second management unit in a process of establishing the connection, and simplifies a management operation performed on the target network function instance.

Figure 5:
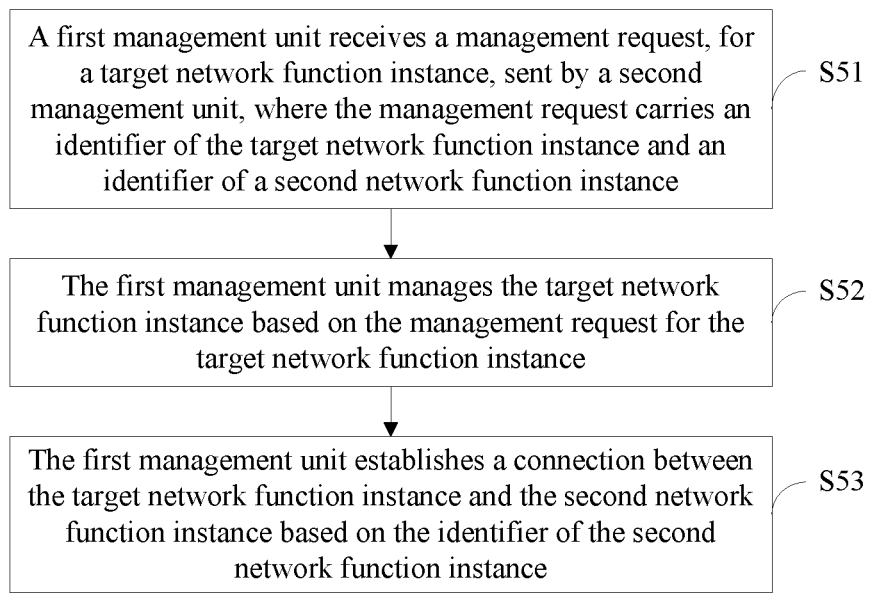
FIG. 5 is a fourth schematic flowchart of a network function instance management method according to an embodiment of the present invention.

Referring to FIG. 5, an embodiment of the present invention further provides a network function instance management method. The method includes the following steps:

Step S51: A first management unit receives a management request, for a target network function instance, sent by a second management unit, where the management request carries an identifier of the target network function instance and an identifier of a second network function instance, and the identifier of the second network function instance is used to determine a connection between the target network function instance and the second network function instance.

Step S52: The first management unit manages the target network function instance based on the management request for the target network function instance.

Step S53: The first management unit establishes the connection between the target network function instance and the second network function instance based on the identifier of the second network function instance.

The first management unit and the second management unit may be but are not limited to any one of management units such as a BSS/OSS, an app manager, an EM unit, an MEO, an NFVO, a VNFM, an NM, an SO, and an NO. It can be understood that when the first management unit is one of the foregoing management units, the second management unit may be any one of remaining management units different from the first management unit. For example, when the first management unit is the app manager, the second management unit may be but is not limited to any one of management units such as the BSS/OSS, the EM unit, the MEO, the NFVO, the VNFM, the NM, the SO, and the NO.

The network function instance may be but is not limited to a VNF instance, an app instance, a network element instance, or the like. For example, the target network function instance may be an app network function instance or the app instance, and the second network function instance may be a platform network function instance or a logical network element such as a platform network element or any other network element used as a platform network element. The management request for the target network function instance may be a relocation (Relocation) request for the target network function instance.

The management request further carries an identifier of a first network function instance, and the identifier of the first network function instance is used to release a connection between the target network function instance and the first network function instance. It can be understood that the first network function instance may be a platform network function instance or a logical network element.

It can be understood that before the establishing the connection between the target network function instance and the second network function instance based on the identifier of the second network function instance, or after the establishing the connection between the target network function instance and the second network function instance based on the identifier of the second network function instance, the method further includes:

releasing the connection between the target network function instance and the first network function instance.

In this embodiment, the management request may further carry an operation type identifier, and the operation type identifier is used to determine a time at which the connection between the target network function instance and the first network function instance is released. For example, when the operation type identifier is a first type, the time at which the connection between the target network function instance and the first network function instance is released may be earlier than a time at which the connection between the target network function instance and the second network function instance is established based on the identifier of the second network function instance; or when the operation type identifier is a second type, the time at which the connection between the target network function instance and the first network function instance is released may be later than a time at which the connection between the target network function instance and the second network function instance is established based on the identifier of the second network function instance.

The establishing the connection between the target network function instance and the second network function instance based on the identifier of the second network function instance includes:

searching for an access information instance of the second network function instance based on the identifier of the second network function instance; and establishing the connection between the target network function instance and the second network function instance based on the access information instance of the second network function instance.

Figure 6:
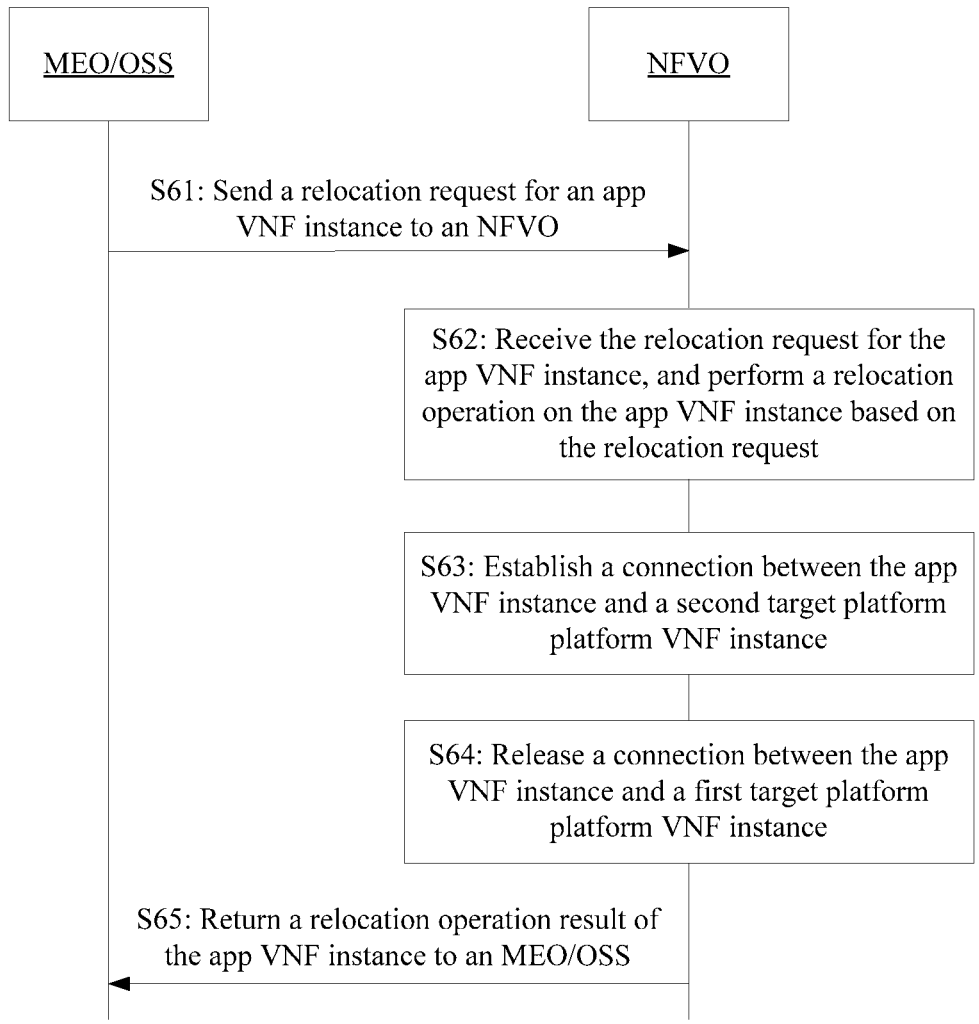
FIG. 6 is a fifth schematic flowchart of a network function instance management method according to an embodiment of the present invention.

Referring to FIG. 6, in this embodiment, the first management unit is an NFVO, the second management unit is an MEO/OSS, the target network function instance is an app VNF instance, the first network function instance is a first target platform VNF instance, the second network function instance is a second platform VNF instance, and the management request for the target network function instance is a relocation request for the app VNF instance. In this case, the method includes the following steps:

Step S61: The MEO/OSS sends the relocation request for the app VNF instance to the NFVO, where the relocation request for the app VNF instance carries an identifier of the app VNF instance (App VNF Instance ID), an identifier of the first target platform VNF instance (Source Platform VNF Instance ID), and an identifier of the second target platform VNF instance (Target Platform VNF Instance ID).

Step S62: The NFVO receives the relocation request for the app VNF instance, and performs a relocation operation on the app VNF instance based on the relocation request.

Step S63: The NFVO establishes a connection between the app VNF instance and the second target platform VNF instance based on the target platform VNF instance ID.

Step S64: The NFVO releases a connection between the app VNF instance and the first target platform VNF instance based on the source platform VNF instance ID.

Step S65: The NFVO returns a relocation operation result of the app VNF instance to the MEO/OSS, where the operation result includes the identifier of the second target platform VNF instance (Target Platform VNF Instance ID).

It can be understood that a time at which the connection between the app VNF instance and the first target platform VNF instance is released may be earlier than a time at which the connection between the app VNF instance and the second target platform VNF instance is established, or may be later than a time at which the connection between the app VNF instance and the second target platform VNF instance is established. Optionally, the relocation request for the app VNF instance may further carry an operation type identifier, and the operation type identifier is used to determine the time at which the connection between the app VNF instance and the first target platform VNF instance is released. For example, when the operation type identifier is a first type, the time at which the connection between the app VNF instance and the first target platform VNF instance is released may be earlier than the time at which the connection between the app VNF instance and the second target platform VNF instance is established; or when the operation type identifier is a second type, the time at which the connection between the app VNF instance and the first target platform VNF instance is released may be later than the time at which the connection between the app VNF instance and the second target platform VNF instance is established.

In this embodiment, the management request for the target network function instance carries the identifier of the target network function instance, the identifier of the first network function instance, and the identifier of the second network function instance, and the identifier of the second network function instance may be used to determine the connection between the target network function instance and the second network function instance. In this way, the first management unit can automatically establish the connection between the target network function instance and the second network function instance based on the management request for the target network function instance and automatically release the connection between the target network function instance and the first network function instance, so as to relocate the target network function instance from the connection to the first network function instance to the connection to the second network function instance. This can implement a relocation operation on the target network function instance conveniently.

Figure 7:
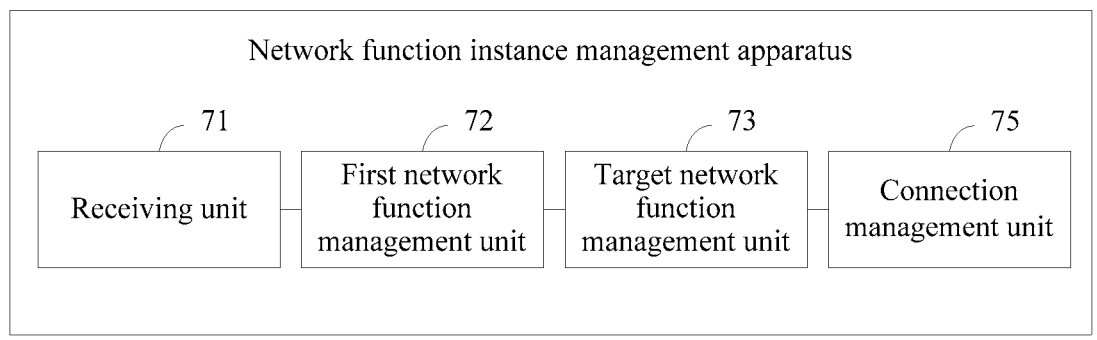
FIG. 7 is a first schematic structural diagram of a network function instance management apparatus according to an embodiment of the present invention.

Referring to FIG. 7, an embodiment of the present invention further provides a network function instance management apparatus 70, including:

a receiving unit 71, configured to receive a management request for a target network function instance, where the management request for the target network function instance carries an identifier of a target virtualized network function descriptor and an identifier of a first network function instance, and the identifier of the first network function instance is used to determine a connection between the target network function instance and the first network function instance;

a target network function management unit 73, configured to manage the target network function instance based on the management request for the target network function instance; and a connection management unit 75, configured to establish the connection between the target network function instance and the first network function instance based on the identifier of the first network function instance.

The receiving unit 71 is further configured to receive a management request for the first network function instance, where the management request for the first network function instance carries an identifier of a first network function descriptor.

The apparatus further includes a first network function management unit 72, configured to manage the first network function instance based on the management request for the first network function instance.

The receiving unit 71 is further configured to receive the first virtualized network function descriptor, where the first virtualized network function descriptor includes type information of the first network function instance.

The receiving unit 71 is further configured to receive an access information management request for the first network function instance, where the access information management request is used to generate an access information instance of the first network function instance.

The first network function management unit 72 is further configured to generate the access information instance of the first network function instance based on access information of the first network function instance, where the access information of the first network function instance is included in the access information management request for the first network function instance or the first virtualized network function descriptor.

The access information of the first network function instance includes one or more of an external connection point descriptor identifier, a connection requirement, and a maximum accessible quantity of the first network function instance.

The access information instance of the first network function instance includes one or more of the instance identifier, external connection point instance information, the connection requirement, and the maximum accessible quantity of the first network function instance.

The receiving unit 71 is further configured to receive the target virtualized network function descriptor, where the target virtualized network function descriptor includes type information of the target network function instance.

The target network function management unit 73 is further configured to:

obtain the corresponding target virtualized network function descriptor based on the identifier of the target virtualized network function descriptor;

determine a type of the target network function instance based on the type information of the target network function instance in the target virtualized network function descriptor; and manage the target network function instance based on the target virtualized network function descriptor and the type of the target network function instance.

The connection management unit 75 is further configured to: search for the access information instance of the first network function instance based on the identifier of the first network function instance; and establish the connection between the target network function instance and the first network function instance based on the access information instance of the first network function instance.

It can be understood that for functions and specific implementation of the constituent units of the network function instance management apparatus 70, reference may be further made to related descriptions in the method embodiments shown in FIG. 2 to FIG. 6 in the present invention. Details are not described herein again.

Figure 8:
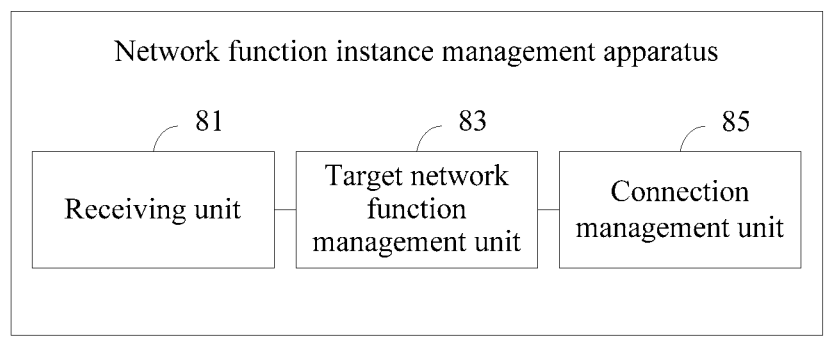
FIG. 8 is a second schematic structural diagram of a network function instance management apparatus according to an embodiment of the present invention.

Referring to FIG. 8, an embodiment of the present invention further provides a network function instance management apparatus 80, including:

a receiving unit 81, configured to receive a management request for a target network function instance, where the management request carries an identifier of the target network function instance and an identifier of a second network function instance, and the identifier of the second network function instance is used to determine a connection between the target network function instance and the second network function instance;

a target network function management unit 83, configured to manage the target network function instance based on the management request for the target network function instance; and a connection management unit 85, configured to establish the connection between the target network function instance and the second network function instance based on the identifier of the second network function instance.

The management request further carries an identifier of a first network function instance, and the identifier of the first network function instance is used to release a connection between the target network function instance and the first network function instance.

The management request further carries an operation type identifier, and the operation type identifier is used to determine a time at which the connection between the target network function instance and the first network function instance is released.

Before establishing the connection between the target network function instance and the second network function instance based on the identifier of the second network function instance, or after establishing the connection between the target network function instance and the second network function instance based on the identifier of the second network function instance, the connection management unit 85 is further configured to:

release the connection between the target network function instance and the first network function instance.

The connection management unit 85 is further configured to:

search for an access information instance of the second network function instance based on the identifier of the second network function instance; and establish the connection between the target network function instance and the second network function instance based on the access information instance of the second network function instance.

It can be understood that for functions and specific implementation of the constituent units of the network function instance management apparatus 80, reference may be further made to related descriptions in the method embodiments shown in FIG. 2 to FIG. 6 in the present invention. Details are not described herein again.

Figure 9:
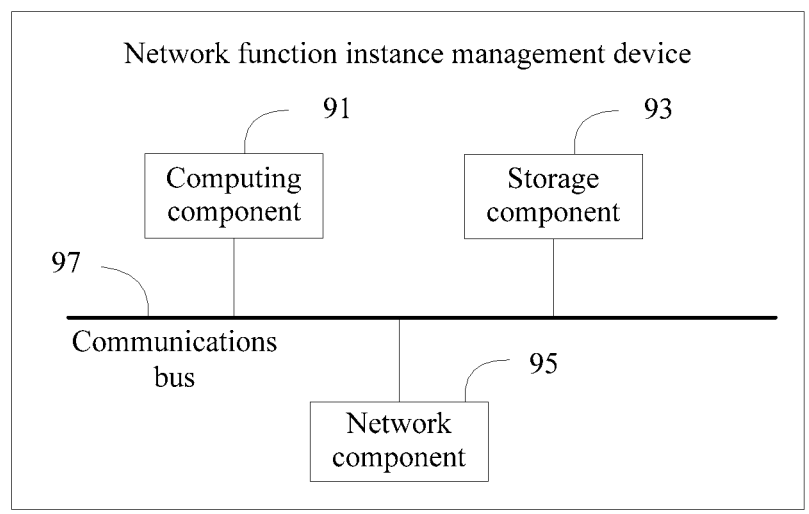
FIG. 9 is a schematic structural diagram of a network function instance management device according to an embodiment of the present invention.

Referring to FIG. 9, an embodiment of the present invention further provides a network function instance management device 90, including at least one computing component 91, at least one storage component 93, at least one network component 95, and a communications bus 97. The computing component 91, the storage component 93, and the network component 95 are connected to and communicate with each other by using the communications bus 97. The computing component 91 is configured to invoke executable program code stored in the storage component 93, so as to deploy the target network function instance and a first network function instance and/or a second network function instance through network functions virtualization and manage the target network function instance by executing the executable program code.

In an implementation, the computing component 91 is configured to: invoke the executable program code stored in the storage component 93, and perform the following operations:

receiving a management request for the target network function instance, where the management request for the target network function instance carries an identifier of a target virtualized network function descriptor and an identifier of the first network function instance, and the identifier of the first network function instance is used to determine a connection between the target network function instance and the first network function instance;

managing the target network function instance based on the management request for the target network function instance; and establishing the connection between the target network function instance and the first network function instance based on the identifier of the first network function instance.

Before the receiving a management request for the target network function instance, the operations further include:

receiving a management request for the first network function instance, where the management request for the first network function instance carries an identifier of a first virtualized network function descriptor; and managing the first network function instance based on the management request for the first network function instance.

Before the receiving a management request for the first network function instance, the operations further include:

receiving the first virtualized network function descriptor, where the first virtualized network function descriptor includes type information of the first network function instance.

Before the receiving a management request for the first network function instance, the operations further include:

receiving an access information management request for the first network function instance, where the access information management request is used to generate an access information instance of the first network function instance.

After the receiving an access information management request for the first network function instance, the operations further include:

generating the access information instance of the first network function instance based on access information of the first network function instance, where the access information of the first network function instance is included in the access information management request for the first network function instance or the first virtualized network function descriptor.

The access information of the first network function instance includes one or more of an external connection point descriptor identifier, a connection requirement, and a maximum accessible quantity of the first network function instance.

The access information instance of the first network function instance includes one or more of the instance identifier, external connection point instance information, the connection requirement, and the maximum accessible quantity of the first network function instance.

Before the receiving a management request for the target network function instance, the operations further include:

receiving the target virtualized network function descriptor, where the target virtualized network function descriptor includes type information of the target network function instance.

The managing the target network function instance includes:

obtaining the corresponding target virtualized network function descriptor based on the identifier of the target virtualized network function descriptor;

determining a type of the target network function instance based on the type information of the target network function instance in the target virtualized network function descriptor; and managing the target network function instance based on the target virtualized network function descriptor and the type of the target network function instance.

The establishing the connection between the target network function instance and the first network function instance based on the identifier of the first network function instance includes:

searching for the access information instance of the first network function instance based on the identifier of the first network function instance; and establishing the connection between the target network function instance and the first network function instance based on the access information instance of the first network function instance.

In another implementation, the computing component 91 is configured to: invoke the executable program code stored in the storage component 93, and perform the following operations:

receiving a management request for the target network function instance, where the management request carries an identifier of the target network function instance and an identifier of the second network function instance, and the identifier of the second network function instance is used to determine a connection between the target network function instance and the second network function instance;

managing the target network function instance based on the management request for the target network function instance; and establishing the connection between the target network function instance and the second network function instance based on the identifier of the second network function instance.

The management request further carries an identifier of a first network function instance, and the identifier of the first network function instance is used to release a connection between the target network function instance and the first network function instance.

The management request further carries an operation type identifier, and the operation type identifier is used to determine a time at which the connection between the target network function instance and the first network function instance is released.

Before the establishing the connection between the target network function instance and the second network function instance based on the identifier of the second network function instance, or after the establishing the connection between the target network function instance and the second network function instance based on the identifier of the second network function instance, the operations further include:

releasing the connection between the target network function instance and the first network function instance.

The establishing the connection between the target network function instance and the second network function instance based on the identifier of the second network function instance includes:

searching for an access information instance of the second network function instance based on the identifier of the second network function instance; and establishing the connection between the target network function instance and the second network function instance based on the access information instance of the second network function instance.

It can be understood that for the operation steps and implementations thereof, reference may be further made to related descriptions in the method embodiments shown in FIG. 2 to FIG. 6. Details are not described herein again.

It can be understood that the computing component 91 may be commodity off-the-shelf (COTS) hardware and/or client hardware configured to provide a processing and computing resource. The storage component 93 may provide a storage capacity. The storage capacity may be provided on a network or reside in the storage component 93 (for example, located in a local memory of a server). Optionally, the computing component 91 and the storage component 93 may be integrated together. The network component 95 may a switch (such as a commercial switch), a router, and/or any other network component that perform/performs a switching function. The network component 95 may span a plurality of domains and may include a plurality of networks interconnected by using one or more transmission networks.

The network function instance management device sets the executable program code in the storage component, and invokes the executable program code by using the computing component, so as to deploy the target network function instance and the first network function instance and/or the second network function instance through network functions virtualization. Further, a function of the management device according to this embodiment of the present invention is performed, and the connection between the target network function instance and the first network function instance or the second network function instance is automatically established, so that the target network function instance is flexibly managed.

What is disclosed above is merely example embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

The invention claimed is:

1. A network function instance management method, comprising:
    receiving, by a first management unit, a management request for a target network function instance from a second management unit, wherein the management request for the target network function instance carries an identifier of a target virtualized network function descriptor and an identifier of a first network function instance, and the identifier of the first network function instance is used to determine a connection between the target network function instance and the first network function instance;
    managing, by the first management unit, the target network function instance based on the management request for the target network function instance; and
    establishing, by the first management unit, the connection between the target network function instance and the first network function instance based on the identifier of the first network function instance,
    wherein before the receiving a management request for a target network function instance, the method further comprises:
    receiving, by the first management unit, an access information management request for the first network function instance from the second management unit, wherein the access information management request is used to generate an access information instance of the first network function instance based on access information of the first network function instance comprised in the access information management request, wherein the access information instance of the first network function instance comprises one or more of an external connection point descriptor identifier, a connection requirement, and a maximum accessible quantity of the first network function instance.

2. The method according to claim 1, wherein after the receiving an access information management request for the first network function instance, the method further comprises:
    generating, by the first management unit, the access information instance of the first network function instance based on the access information of the first network function instance.

3. The method according to claim 1, wherein the access information instance of the first network function instance comprises one or more of the instance identifier, external connection point instance information, the connection requirement, and the maximum accessible quantity of the first network function instance.

4. The method according to claim 1, wherein the managing the target network function instance comprises:
    obtaining the corresponding target virtualized network function descriptor based on the identifier of the target virtualized network function descriptor; and
    managing the target network function instance based on the target virtualized network function descriptor.

5. The method according to claim 1, wherein the establishing the connection between the target network function instance and the first network function instance based on the identifier of the first network function instance comprises:
    searching, by the first management unit, for the access information instance of the first network function instance based on the identifier of the first network function instance; and
    establishing, by the first management unit, the connection between the target network function instance and the first network function instance based on the access information instance of the first network function instance.

6. The method according to claim 1, wherein the management request for the target network function instance further carries an identifier of a second network function instance, and the identifier of the second network function instance is used to release a connection between the target network function instance and the second network function instance.

7. The method according to claim 6, wherein the management request for the target network function instance further carries an operation type identifier, and the operation type identifier is used to determine a time at which the connection between the target network function instance and the second network function instance is released.

8. The method according to claim 6, the method further comprises:
    releasing, by the first management unit, the connection between the target network function instance and the second network function instance.

9. A network function instance management device, comprising at least one computing component, at least one storage component, at least one network component, and a communications bus, wherein the computing component, the storage component, and the network component are connected to and communicate with each other by using the communications bus; and the computing component is configured to: invoke executable program code stored in the storage component, and perform the following operations:
    receiving a management request for a target network function instance from a second management unit, wherein the management request for the target network function instance carries an identifier of a target virtualized network function descriptor and an identifier of a first network function instance, and the identifier of the first network function instance is used to determine a connection between the target network function instance and the first network function instance;
    managing the target network function instance based on the management request for the target network function instance; and
    establishing the connection between the target network function instance and the first network function instance based on the identifier of the first network function instance,
    wherein before the receiving a management request for a target network function instance, the operations further comprise:
    receiving an access information management request for the first network function instance from the second management unit, wherein the access information management request is used to generate an access information instance of the first network function instance based on access information of the first network function instance comprised in the access information management request, wherein the access information of the first network function instance comprises one or more of an external connection point descriptor identifier, a connection requirement, and a maximum accessible quantity of the first network function instance.

10. The device according to claim 9, wherein after the receiving an access information management request for the first network function instance, the operations further comprise:
    generating the access information instance of the first network function instance based on the access information of the first network function instance.

11. The device according to claim 9, wherein the access information instance of the first network function instance comprises one or more of the instance identifier, external connection point instance information, the connection requirement, and the maximum accessible quantity of the first network function instance.

12. The device according to claim 9, wherein the managing the target network function instance comprises:
    obtaining the corresponding target virtualized network function descriptor based on the identifier of the target virtualized network function descriptor; and
    managing the target network function instance based on the target virtualized network function descriptor.

13. The device according to claim 9, wherein the establishing the connection between the target network function instance and the first network function instance based on the identifier of the first network function instance comprises:
    searching for the access information instance of the first network function instance based on the identifier of the first network function instance; and
    establishing the connection between the target network function instance and the first network function instance based on the access information instance of the first network function instance.

14. The device according to claim 9, wherein the management request for the target network function instance further carries an identifier of a second network function instance, and the identifier of the second network function instance is used to release a connection between the target network function instance and the second network function instance.

15. The device according to claim 14, wherein the management request for the target network function instance further carries an operation type identifier, and the operation type identifier is used to determine a time at which the connection between the target network function instance and the second network function instance is released.

16. The device according to claim 14, wherein the operations further comprise:
    releasing the connection between the target network function instance and the first network function instance.

* * * * *